(12) United States Patent
Mizuno

(10) Patent No.: US 12,476,248 B2
(45) Date of Patent: Nov. 18, 2025

(54) ALL SOLID STATE BATTERY, METHOD FOR PRODUCING ALL SOLID STATE BATTERY, AND METHOD FOR RECOVERING ALL SOLID STATE BATTERY

(71) Applicant: TOYOTA JIDOSHA KABUSHIKI KAISHA, Toyota (JP)

(72) Inventor: Fuminori Mizuno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 793 days.

(21) Appl. No.: 17/747,424

(22) Filed: May 18, 2022

(65) Prior Publication Data

US 2022/0393160 A1 Dec. 8, 2022

(30) Foreign Application Priority Data

May 28, 2021 (JP) ................. 2021-089802

(51) Int. Cl.
*H01M 4/38* (2006.01)
*H01M 4/02* (2006.01)
*H01M 10/0562* (2010.01)
*H01M 10/44* (2006.01)

(52) U.S. Cl.
CPC ....... *H01M 4/386* (2013.01); *H01M 10/0562* (2013.01); *H01M 10/443* (2013.01); *H01M 2004/021* (2013.01)

(58) Field of Classification Search
CPC ............. H01M 4/386; H01M 10/0562; H01M 2004/021
See application file for complete search history.

(56) References Cited

U.S. PATENT DOCUMENTS

| | | | |
|---|---|---|---|
| 2013/0084491 A1 | 4/2013 | Nakamoto et al. | |
| 2020/0161701 A1* | 5/2020 | Koike | H01M 4/623 |
| 2020/0168904 A1 | 5/2020 | Nomoto | |
| 2020/0358088 A1* | 11/2020 | Lin | H01M 4/625 |
| 2022/0006124 A1* | 1/2022 | Lee | H01M 10/0569 |
| 2022/0052316 A1* | 2/2022 | Collins | H01L 21/02123 |

(Continued)

FOREIGN PATENT DOCUMENTS

| | | |
|---|---|---|
| CN | 102656150 A | 9/2012 |
| CN | 112436141 A | 3/2021 |
| JP | 2009-176599 A | 8/2009 |

(Continued)

OTHER PUBLICATIONS

Investigation of an Intermediate Temperature Molten Lithium Salt Based on Fluorosulfonyl(trifluoromethylsulfonyl)amide as a Solvent-Free Lithium Battery Electrolyte (Year: 2013).*

(Continued)

*Primary Examiner* — Nicholas A Smith
(74) *Attorney, Agent, or Firm* — Dinsmore & Shohl LLP

(57) ABSTRACT

A main object of the present disclosure is to provide an all solid state battery with capacity durability. The present disclosure achieves the object by providing an all solid state battery including a cathode layer, an anode layer, and a solid electrolyte layer arranged between the cathode layer and the anode layer, wherein the anode layer contains a granulated body including a Si-based active material and a molten salt, which is in a solid state at 25° C.

10 Claims, 3 Drawing Sheets

(56) References Cited

U.S. PATENT DOCUMENTS

2022/0294009 A1  9/2022  Uchida et al.

FOREIGN PATENT DOCUMENTS

| JP | 2020-004685 A | 1/2020 |
|---|---|---|
| JP | 2020-087783 A | 6/2020 |
| JP | 2020161475 A | 10/2020 |
| WO | 2011/074325 A1 | 6/2011 |
| WO | 2021033424 | 2/2021 |

OTHER PUBLICATIONS

Lithium bis(trifluoromethanesulfonyl)imide (Year: 2020).*
Oakwood Chemical (https://www.oakwoodchemical.com/ProductsList.aspx?CategoryID=-2&txtSearch=6187&ExtHyperLink=1) (Year: 2025).*
Cai Yingjun et al., "Muftifunctional imidazolium-based ionic liquid as additive for silicon/ carbon lithium ion batteries", Electrochimica Acta, Elesevier, Amsterdam, NL, vol. 340, Feb. 28, 2020.
Erwann Luais et al. "Improved cychng performances of binder-free macroporous silicon Li-ion negative electrodes using room temperature ionic liquid electrolyte", Journal of Solid State Electrochemistry, Springer, Berlin, DE, vol. 23, No. 3, Jan. 19, 2019 pp. 937-941.
Shobukawa Hitoshi et al. "Electrochemical reaction and surface chemistry for performance enhancement of a Si composite bis(fluorosulfonyl)imide-based ionic liquid", Journal of Materials Chemistry A, vol. 4, No. 39, Oct. 4, 2016, pp. 15117-15125.

* cited by examiner

ALL SOLID STATE BATTERY, METHOD FOR PRODUCING ALL SOLID STATE BATTERY, AND METHOD FOR RECOVERING ALL SOLID STATE BATTERY

CROSS-REFERENCE TO RELATED APPLICATIONS

This application is based upon and claims the benefit of priority of the prior Japanese Patent Application No. 2021-089802 filed May 28, 2021, the entire contents of which are incorporated herein by reference.

TECHNICAL FIELD

The present disclosure relates to an all solid state battery.

BACKGROUND ART

An all solid state battery is a battery including a solid electrolyte layer between a cathode layer and an anode layer, and one of the advantages thereof is that the simplification of a safety device may be more easily achieved compared to a liquid-based battery including a liquid electrolyte containing a flammable organic solvent. Also, as an active material used for an all solid state battery, a Si-based active material has been known. For example, Patent Literature 1 discloses an all solid state battery using a Si-containing active material as an anode active material.

Meanwhile, a molten salt with ion conductivity and electron conductivity has been known. For example, Patent Literature 2 discloses a molten salt containing a specified first imidazolium salt and a specified second salt.

CITATION LIST

Patent Literatures

Patent Literature 1: Japanese Patent Application Laid-Open (JP-A) No. 2020-004685
Patent Literature 2: International Application Publication: WO 2011/074325

SUMMARY OF DISCLOSURE

Technical Problem

The theoretical capacity of Si is large and it is advantageous to allow an all solid state battery to have high energy density. On the other hand, the volume change of Si during charge and discharge is large, and thus crack is easily generated in an anode layer when the charge and discharge are repeated. When a crack is generated in the anode layer, an ion conducting path and an electron conducting path are cut off, and the capacity durability degrades over time.

The present disclosure has been made in view of the above circumstances, and a main object thereof is to provide an all solid state battery with capacity durability.

Solution to Problem

The present disclosure provides an all solid state battery including a cathode layer, an anode layer, and a solid electrolyte layer arranged between the cathode layer and the anode layer, wherein the anode layer contains a granulated body including a Si-based active material and a molten salt, which is in a solid state at 25° C.

According to the present disclosure, the anode layer contains a granulated body including a Si-based active material and a molten salt, and thus the all solid state battery may have capacity durability.

In the disclosure, a melting point of the molten salt may be 30° C. or more and 120° C. or less.

In the disclosure, the molten salt may include an anion with a sulfonylamide structure.

In the disclosure, the anode layer may contain lithium bis(trifluoromethanesulfonyl)amide as the molten salt.

In the disclosure, the anode layer may contain a sulfide solid electrolyte.

In the disclosure, an average particle size $D_{50}$ of the Si-based active material may be 2 μm or less.

The present disclosure also provides a method for producing an all solid state battery including a cathode layer, an anode layer, and a solid electrolyte layer arranged between the cathode layer and the anode layer, the method comprising an anode layer forming step of forming the anode layer containing a granulated body including a Si-based active material and a molten salt, which is in a solid state at 25° C.

According to the present disclosure, by forming the anode layer containing a granulated body including a Si-based active material and a molten salt, the all solid state battery with capacity durability may be obtained.

In the disclosure, the anode layer forming step may include: a granulated body forming treatment of forming the granulated body by kneading the Si-based active material and the molten salt; an anode mixture producing treatment of producing an anode mixture by agitating a mixture of the granulated body with at least one of a solid electrolyte and a conductive material; and an anode layer forming treatment of forming the anode layer using the anode mixture.

The present disclosure also provides a method for recovering an all solid state battery including a cathode layer, an anode layer, and a solid electrolyte layer arranged between the cathode layer and the anode layer, wherein the anode layer contains a granulated body including a Si-based active material and a molten salt, which is in a solid state at 25° C.; and the method comprising a high temperature charge and discharge step of conducting charge and discharge at a temperature equal to or more than a melting point of the molten salt.

According to the present disclosure, to the all solid state battery including an anode layer containing a granulated body including a Si-based active material and a molten salt, charge and discharge at a temperature equal to or more than a melting point of molten salt is conducted, and thus the capacity durability may be recovered.

Effects of Disclosure

The present disclosure exhibits an effect of providing an all solid state battery with capacity durability.

DESCRIPTION OF EMBODIMENTS

The all solid state battery, the method for producing the all solid state battery, and the method for recovering the all solid state battery in the present disclosure will be hereinafter explained in details.

A. All Solid State Battery

Figure 1:
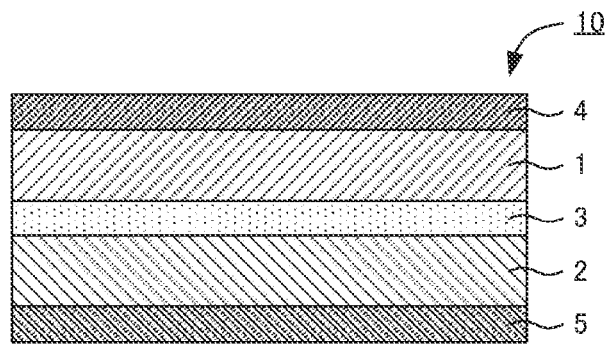
FIG. 1 is a schematic cross-sectional view exemplifying the all solid state battery in the present disclosure.

FIG. 1 is a schematic cross-sectional view exemplifying the all solid state battery in the present disclosure. All solid state battery 10 illustrated in FIG. 1 includes cathode layer 1, anode layer 2, solid electrolyte layer 3 arranged between the cathode layer 1 and the anode layer 2, cathode current collector 4 for collecting currents of the cathode layer 1, and anode current collector 5 for collecting currents of the anode layer 2. The anode layer 2 contains a granulated body including a Si-based active material and a molten salt, which is in a solid state at 25° C.

According to the present disclosure, the anode layer contains a granulated body including a Si-based active material and a molten salt, and thus the all solid state battery may have capacity durability. As described above, the volume change of the Si-based active material represented by Si is large during charge and discharge, and thus a crack is easily generated in the anode layer when the charge and discharge are repeated. When a crack is generated in the anode layer, an ion conducting path and an electron conducting path are cut off, and the capacity durability degrades over time. In contrast, the granulated body including a Si-based active material and a molten salt is used in the present disclosure. For example, in an environment at a temperature less than the melting point of the molten salt, the molten salt in a solid state works as cushioning to the expansion and contraction of the Si-based active material, and thus the generation of crack in the anode layer may be inhibited. Meanwhile, in an environment at a temperature equal to or more than the melting point of the molten salt, the molten salt in a liquid state fills in the crack of the anode layer to repair. In this manner, by using the granulated body including the Si-based active material and the molten salt, an all solid state battery with capacity durability is obtained.

1. Anode Layer

The anode layer in the present disclosure contains a specified granulated body. The granulated body in the present disclosure includes a Si-based active material and a molten salt, which is in a solid state at 25° C. The molten salt in the present disclosure corresponds to an ionic compound that is in a solid state at 25° C. (normal temperature). The molten salt in the present disclosure is different from an ionic liquid (Room Temperature Ionic Liquid, RTIL) that is in a liquid state at 25° C. When a plurality of the Si-based active material particle aggregates via the molten salt, the granulated body is formed. Whether the anode layer contains the granulated body or not may be determined by, for example, observing the cross-section of the anode layer with a scanning electron microscope—energy dispersion X-ray measurement (SEM-EDX measurement). In specific, when it is confirmed that the Si elements included in the Si-based active material and the constituent elements of the molten salt are concentrated at the same point based on the cross-section EDX analysis, and further when it is confirmed that the particles of the Si-based active material are aggregated based on the cross-section SEM image analysis, the anode layer is determined to contain the granulated body. Also, the granulated body may or may not contain a binder. The granulated body may not contain a solid electrolyte. In the same manner, the granulated body may not contain a conductive material.

The melting point of the molten salt is usually higher than 25° C., may be 30° C. or more, may be 40° C. or more, and may be 50° C. or more. If the melting point of the molten salt is too low, the production of the granulated body may be difficult. Meanwhile, the melting point of the molten salt is, for example, 120° C. or less, may be 100° C. or less, and may be 80° C. or less. If the melting point of the molten salt is too high, there is a possibility that the crack in the anode layer may not be filled in and the degrade in capacity durability over time may not be sufficiently inhibited.

The molten salt includes a cation and an anion. Examples of the cation may include an inorganic cation such as a lithium ion, a sodium ion, a potassium ion, and a cesium ion; and an organic cation such as an ammonium-based cation, a piperidinium-based cation, a pyrrolidinium-based cation, a imidazolium-based cation, a pyridium-based cation, an alicyclic amine-based cation, an aliphatic amine-based cation, and an aliphatic phosphonium-based cation. The molten salt may contain just one kind of the cation, and may contain two kinds or more thereof. Also, the molten salt may contain both of the inorganic cation and the organic cation as the cation. In some embodiments, the molten salt contains at least a lithium ion as the cation. The reason therefor is to improve lithium ion conductivity in the granulated body.

Examples of the anion may include an anion with a sulfonylamide structure. Examples of the anion with the sulfonylamide structure may include bis(trifluoromethanesulfonyl)amide, bis(fluorosulfonyl)amide, bis(pentafluoroethanesulfonyl)amide, and (fluorosulfonyl)(trifluoromethanesulfonyl)amide. The molten salt may contain just one kind of the anion, and may contain two kinds or more thereof.

In some embodiments, the molten salt contains at least lithium bis(trifluoromethanesulfonyl)amide (Li-TFSA), and may contain lithium bis(trifluoromethanesulfonyl)amide (Li-TFSA) and tetrabutylammonium bis(trifluoromethanesulfonyl)amide (TBA-TFSA). The molar ratio of the TBA-TFSA with respect to the Li-TFSA is, for example, 0.5 or more, may be 1 or more, and may be 2 or more. Meanwhile, the molar ratio is, for example, 100 or less and may be 50 or less.

In some embodiments, the molten salt contains at least lithium bis(fluorosulfonyl)amide (Li-FSA), and may contain lithium bis(fluorosulfonyl)amide (Li-FSA) and cesium bis(fluorosulfonyl)amide (Cs-FSA). The molar ratio of the Cs-FSA with respect to the Li-FSA is, for example, 0.5 or more, may be 1 or more, and may be 2 or more. Meanwhile, the molar ratio is, for example, 100 or less and may be 50 or less.

Also, the molten salt may include a first imidazolium salt containing a cation represented by a general formula (1) and an anion that is $MX_4$ (M is a transition metal; X is halogen), and a second salt containing a univalent cation and a halogen.

The first imidazolium salt contains a cation represented by a general formula (1).

[Chemical Formula 1]

General Formula (1)

In the general formula (1), each of $R_1$ and $R_2$ is an alkyl group having 1 to 10 carbon atom(s), and may be an alkyl group having 1 to 4 carbon atom(s). Examples of the alkyl group may include an ethyl group, a methyl group, a propyl group, and a butyl group. $R_1$ and $R_2$ may be the same and may be different.

Also, the first imidazolium salt contains $MX_4$ (M is a transition metal; X is halogen). Examples of M may include Fe, Cr, V, Co, Mn, Ti, Ru, and Pb. Meanwhile, examples of X may include F, Cl, Br, and I. In some embodiments, the valent of M in $MX_4$ is divalent or trivalent.

Meanwhile, the second salt contains a univalent cation. An example of the univalent cation may be, but not limited to, a cation represented by a general formula (2).

[Chemical Formula 2]

General Formula (2)

$R_3$ and $R_4$ in the general formula (2) are the same as $R_1$ and $R_2$ described above; thus, the descriptions herein are omitted. Also, $R_3$ may be the same as $R_1$, and $R_4$ may be the same as $R_2$.

Also, additional examples of the univalent cation in the second salt may include but not limited to, an alkali metal ion such as a lithium ion, a sodium ion, and a potassium ion.

Also, the second salt contains halogen. Examples of the halogen in the second salt may include F, Cl, Br, and I.

The proportions of the first imidazolium salt and the second salt in the molten salt are not particularly limited, and the proportion of the second salt with respect to 100 mol parts of the first imidazolium salt is, for example, 100 mol parts or less, may be 80 mol parts or less, and may be 50 mol parts or less. Meanwhile, the proportion of the second salt is, for example, 1 mol part or more.

In some embodiments, the Li ion conductivity of the molten salt is high. The Li ion conductivity of the molten salt at 25° C. is, for example, $1*10^{-6}$ S/cm or more, and may be $1*10^{-5}$ S/cm or more. In some embodiments, the electron conductivity of the molten salt is high.

The Si-based active material is an active material containing a Si element. Examples of the Si-based active material may include a simple substance of Si, a Si alloy, and a Si oxide. In some embodiments, the Si alloy contains a Si element as a main component.

Examples of the shape of the Si-based active material may include a granular shape. The average particle size ($D_{50}$) of the Si-based active material is not particularly limited, and for example, 10 μm or less, may be 5 μm or less, and may be 2 μm or less. If the average particle size of the Si-based active material is too large, the size of the granulated body would also be large, and a crack due to the volume change during charge and discharge would be easily generated in the anode layer. Meanwhile, the average particle size ($D_{50}$) of the Si-based active material is, for example, 0.1 μm or more. If the average particle size of the Si-based active material is too small, the production of the Si-based active material may be difficult. The average particle size ($D_{50}$) may be calculated from, for example, a measurement with a laser diffraction particle distribution meter or a scanning electron microscope (SEM).

The proportions of the Si-based active material and the molten salt in the granulated body are not particularly limited, but the proportion of the molten salt with respect to 100 wt. parts of the Si-based active material is, for example, 1 wt. part or more, may be 5 wt. parts or more, and may be 10 wt. parts or more. If the proportion of the molten salt is too little, there is a possibility that the degrade in capacity durability over time may not be sufficiently inhibited. Meanwhile, the proportion of the molten salt with respect to 100 wt. parts of the Si-based active material is, for example, 30 wt. parts or less, may be 20 wt. parts or less, and may be 15 wt. parts or less. If the proportion of the molten salt is too much, the proportion of the Si-based active material would be relatively little, and there is a possibility the volume energy density may decrease.

The proportion of the granulated body included in the anode layer is, for example, 40 weight % or more, may be 50 weight % or more, and may be 60 weight % or more. Meanwhile, the proportion of the granulated body included in the anode layer is, for example, 95 weight % or less.

The anode layer may further contain at least one of a solid electrolyte, a conductive material, and a binder. Examples of the solid electrolyte may include an inorganic solid electrolyte such as a sulfide solid electrolyte, an oxide solid electrolyte, a nitride solid electrolyte, and a halide solid electrolyte. In some embodiments, the anode layer contains a sulfide solid electrolyte. The reason therefor is that the sulfide solid electrolyte has ion conductivity. It is also because the molten salt is highly chemically stable, and the reaction with the sulfide solid electrolyte does not easily occur.

In some embodiments, the sulfide solid electrolyte contains, for example, a Li element, an X element (X is at least one kind of P, As, Sb, Si, Ge, Sn, B, Al, Ga, and In), and a S element. Also, the sulfide solid electrolyte may contain at least one of a Cl element, a Br element, and an I element, as a halogen element. Also, the sulfide solid electrolyte may contain an O element.

The sulfide solid electrolyte may be a glass-based sulfide solid electrolyte, may be a glass ceramic-based sulfide solid electrolyte, and may be a crystal-based sulfide solid electrolyte. Also, when the sulfide solid electrolyte includes a crystal phase, examples of the crystal phase may include a Thio-LISICON type crystal phase, a LGPS type crystal phase and an argyrodite type crystal phase. Also, known solid electrolytes may be used as an oxide solid electrolyte, a nitride solid electrolyte, and a halide solid electrolyte.

In some embodiments, the Li ion conductivity of the solid electrolyte is high. In some embodiments, the Li ion conductivity of the solid electrolyte at 25° C. is, for example, $1*10^{-4}$ S/cm or more, or $1*10^{-3}$ S/cm or more. Also, examples of the shape of the solid electrolyte may include a granular shape. The average particle size ($D_{50}$) of the solid electrolyte is, for example, 0.1 μm or more and 50 μm or less.

Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF). Also, examples of the binder may include a fluorine-containing binder such as polyvinylidene fluoride (PVDF) and polytetra fluoroethylene (PTFE); a rubber-based binder such as butadiene rubber; and an acryl-based binder. Also, the thickness of the anode layer is, for example, 0.1 µm or more and 1000 µm or less.

2. Cathode Layer

The cathode layer in the present disclosure is a layer containing at least a cathode active material. Also, the cathode layer may contain at least one of a solid electrolyte, a conductive material, and a binder, as required.

Typical example of the cathode active material may be, but not limited to, an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, and $Li(Ni_{0.5}Mn_{1.5})O_4$; and an olivine type active material such as $LiFePO_4$, $LiMnPO_4$, $LiNiPO_4$, and $LiCuPO_4$.

Also, the surface of the cathode active material may be coated with a coating layer. The reason therefor is because the coating layer may inhibit the reaction of the cathode active material and the solid electrolyte (particularly a sulfide solid electrolyte). Examples of the coating layer may include a Li-containing oxide such as $LiNbO_3$, $Li_3PO_4$, LiPON. The average thickness of the coating layer is, for example, 1 nm or more. Meanwhile, the average thickness of the coating layer is, for example, 20 nm or less and may be 10 nm or less.

The solid electrolyte, the conductive material and the binder to be used in the cathode layer are in the same contents as those described in "1. Anode layer" above; thus, the descriptions herein are omitted. Also, the thickness of the cathode layer is, for example, 0.1 µm or more and 1000 µm or less.

3. Solid Electrolyte Layer

The solid electrolyte layer in the present disclosure is a layer formed between the cathode layer and the anode layer, and contains at least a solid electrolyte. Also, the solid electrolyte layer may further contain a binder as required. The solid electrolyte and the binder are in the same contents as those described in "1. Anode layer" above; thus, the descriptions herein are omitted. Also, the thickness of the solid electrolyte layer is, for example, 0.1 µm or more and 1000 µm or less.

4. Other Constitutions

In some embodiments, the all solid state battery in the present disclosure comprises a cathode current collector for collecting currents of the cathode layer, an anode current collector for collecting currents of the anode layer, and a battery case for storing the above described members. Examples of the material for the cathode current collector may include Al, SUS and Ni. Examples of the material for the anode current collector may include Cu, SUS and Ni. As the battery case, known cases may be used.

The all solid state battery in the present disclosure may include a restraining jig that applies a restraining pressure along with the thickness direction of the cathode layer, the solid electrolyte layer and the anode layer. Ion conducting path and electron conducting path may be formed by applying the restraining pressure. The restraining pressure is, for example, 0.1 MPa or more, may be 1 MPa or more, and may be 5 MPa or more. Meanwhile, the restraining pressure is, for example, 100 MPa or less, may be 50 MPa or less, and may be 20 MPa or less. There are no particular limitations on the kind of the restraining jig, and examples thereof may include a restraining jig that applies restraining torque by a bolt.

5. All Solid State Battery

The kind of the all solid state battery in the present disclosure is not particularly limited, but is typically an all solid lithium ion secondary battery. Examples of the application of the all solid state battery may include a power source for vehicles such as hybrid electric vehicles, battery electric vehicles, fuel cell electric vehicles and diesel powered automobiles. In some embodiments, the all solid state battery is used as a power source for driving hybrid electric vehicles and battery electric vehicles. Also, the all solid state battery in the present disclosure may be used as a power source for moving bodies other than vehicles (such as rail road transportation, vessel and airplane), and may be used as a power source for electronic products such as information processing equipment.

B. Method for Producing all Solid State Battery

Figure 2:
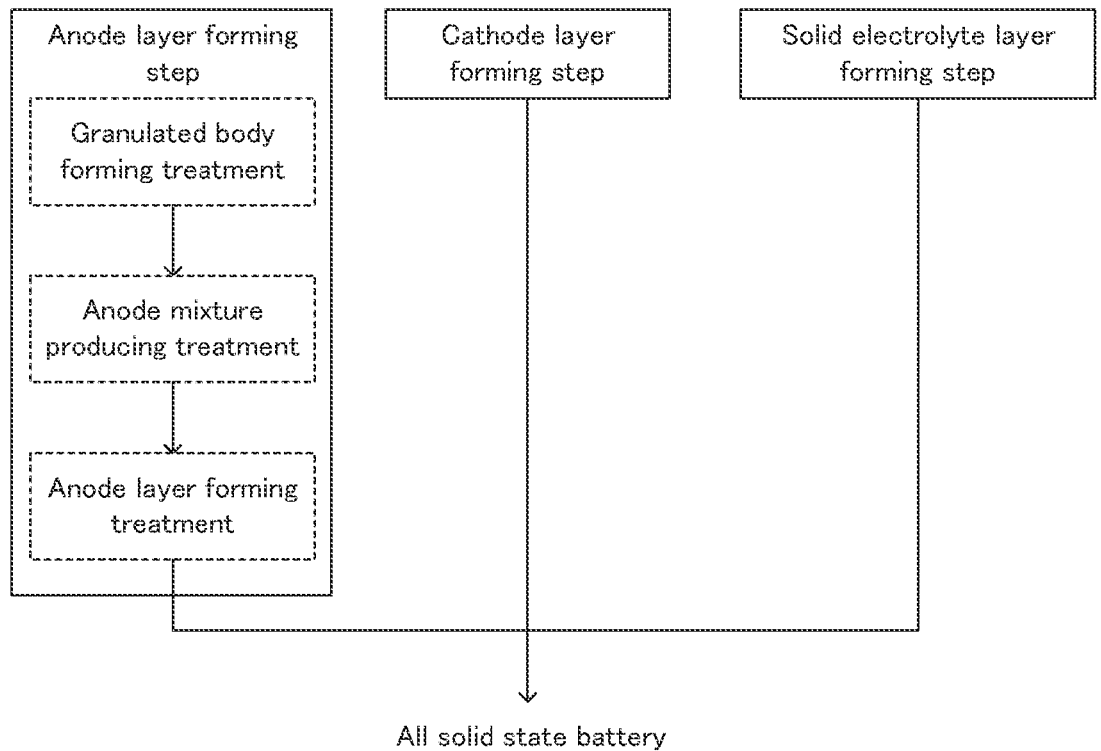
FIG. 2 is a flow chart exemplifying the method for producing the all solid state battery in the present disclosure.

FIG. 2 is a flow chart exemplifying the method for producing the all solid state battery in the present disclosure. The method for producing the all solid state battery shown in FIG. 2 includes an anode layer forming step. In the anode layer forming step, first, a Si-based active material and a molten salt are kneaded to form a granulated body (granulated body forming treatment). Next, an anode mixture is produced by agitating a mixture in which a solid electrolyte, a conductive material and a binder are added to the obtained granulated body (anode mixture producing treatment). Next, an anode layer is formed by using the obtained anode mixture (anode layer forming treatment). Thereby, an anode layer is obtained. Also, a cathode layer is formed in a cathode layer forming step, and a solid electrolyte layer is formed in a solid electrolyte layer forming step. Next, produced layers are layered in the order of, the cathode layer, the solid electrolyte layer and the anode layer in the thickness direction, to obtain an all solid state battery.

According to the present disclosure, by forming the anode layer containing a granulated body including a Si-based active material and a molten salt, and thus the all solid state battery with capacity durability may be obtained.

1. Anode Layer Forming Step

The anode layer forming step in the present disclosure is a step of forming an anode layer containing a granulated body including a Si-based active material and a molten salt. There are no particular limitations on the method for forming the anode layer, but for example, in some embodiments, a granulated body forming treatment is performed, an anode mixture producing treatment and an anode layer forming treatment are performed.

(1) Granulated Body Forming Treatment

The granulated body forming treatment is a treatment of forming a granulated body by kneading the Si-based active material and the molten salt. In specific, a kneading treatment is performed to a mixture (first mixture) containing at least a Si-based active material and a molten salt. The first mixture may include a dispersion medium. By using the dispersion medium, the dispersibility of the Si-based active material and the molten salt improves. When the first mixture includes the dispersion medium, the solid concentration of the first mixture is, for example, 50 weight % or more and 90 weight % or less, and may be 60 weight % or more and 80 weight % or less.

The first mixture may or may not further contain a binder. Also, the first mixture may not contain a solid electrolyte. Similarly, the first mixture may not contain a conductive material.

There are no particular limitations on the kind of the kneading treatment, and examples thereof may include a rotating and revolving mixer. On the occasion of kneading by the rotating and revolving mixer, balls for crushing may or may not be used. The revolving speed of the rotating and revolving mixer is, for example, 300 rpm or more and 600 rpm or less. The treatment time of the rotating and revolving mixer is, for example, 1 hour or more and 100 hours or less.

(2) Anode Mixture Producing Treatment

The anode mixture producing treatment is a treatment of producing an anode mixture by agitating a mixture (second mixture) in which at least one of a solid electrolyte and a conductive material is added to the granulated body. The second mixture may further contain a binder. Also, the second mixture may contain a dispersion medium. An anode slurry is obtained by using the dispersion medium.

(3) Anode Layer Forming Treatment

The anode layer forming treatment is a treatment of forming an anode layer using the aforementioned anode mixture. In the anode layer forming treatment, an anode layer is obtained by, for example, pasting an anode mixture (anode slurry) containing a dispersion medium and drying thereof. Also, the anode slurry may be pasted on an anode current collector. Examples of the method for pasting the anode mixture may include a doctor blade method.

2. Other Steps

The method for producing the all solid state battery in the present disclosure may include a cathode layer forming step of forming a cathode layer. The method for forming the cathode layer is not particularly limited, and examples thereof may include a method of pasting a cathode slurry containing a cathode active material and a dispersion medium, and drying thereof. The cathode slurry may further contain at least one of a conductive material, a solid electrolyte, and a binder. Also, the cathode slurry may be pasted on a cathode current collector.

The method for producing the all solid state battery in the present disclosure may include a solid electrolyte layer forming step of forming a solid electrolyte layer. The method for forming the solid electrolyte layer is not particularly limited, and examples thereof may include a method of pasting and drying a solid electrolyte slurry containing a solid electrolyte and a dispersion medium. The solid electrolyte slurry may further contain a binder. Also, the solid electrolyte slurry may be pasted on a peelable metal foil.

The method for producing the all solid state battery in the present disclosure may include a layering step of layering in the order of a cathode layer, a solid electrolyte layer, and an anode layer, in the thickness direction. In some embodiments, in the layering step, a pressing treatment of pressing the cathode layer, the solid electrolyte layer, and the anode layer in the thickness direction, is performed.

Figure 3:
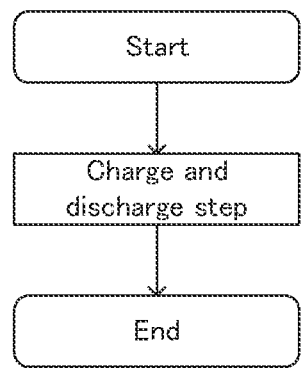
FIG. 3 is a flow chart exemplifying the method for recovering the all solid state battery in the present disclosure.

The present disclosure may also provides a method for recovering an all solid state battery including a cathode layer, an anode layer, and a solid electrolyte layer arranged between the cathode layer and the anode layer, wherein the anode layer contains a granulated body including a Si-based active material and a molten salt, which is in a solid state at 25° C.; and the method comprising a high temperature charge and discharge step of conducting charge and discharge at a temperature equal to or more than a melting point of the molten salt. According to the present disclosure, to the all solid state battery including an anode layer containing a granulated body including a Si-based active material and a molten salt, charge and discharge at a temperature equal to or more than a melting point of molten salt is conducted, and thus the capacity durability may be recovered. FIG. 3 is a flow chart exemplifying the method for recovering the all solid state battery in the present disclosure. As shown in FIG. 3, in the present disclosure, charge and discharge are conducted to an all solid state battery including an anode layer containing a granulated body including a Si-based active material and a molten salt, at a temperature equal to or more than a melting point of the molten salt (high temperature charge and discharge step). Thereby, the capacity durability may be recovered. In some embodiments, the timing of the high temperature charge and discharge step is not particularly limited, but it is the timing after the initial charge and discharge of the all solid state battery. Also, when $T_M$ designates the melting point of the molten salt, temperature in the high temperature charge and discharge step is, for example, $(T_M+5)°$ C. or more, may be $(T_M+10)°$ C. or more, and may be $(T_M+20)°$ C. or more. Meanwhile, temperature in the high temperature charge and discharge step is, for example, $(T_M+50)°$ C. or less, and may be $(T_M+40)°$ C. or less.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Production of Cathode Layer>

A mixture including: a cathode active material (NCA-based cathode active material), a sulfide solid electrolyte ($Li_2S$—$P_2S_5$-based sulfide solid electrolyte), a conductive material (vapor grown carbon fiber), a binder (PVdF-based binder) and a dispersion medium (butyl butyrate) as raw materials, was agitated by an ultrasonic dispersion device to produce a cathode slurry. Here, the weight ratio of the cathode active material:the sulfide solid electrolyte:the conductive material:the binder was 100:16:2:0.75. This cathode slurry was pasted on a cathode current corrector (Al foil) by a blade method, and dried on a hot plate at 100° C. for 30 minutes to obtain a cathode layer.

<Synthesis of Molten Salt>

Figure 4:
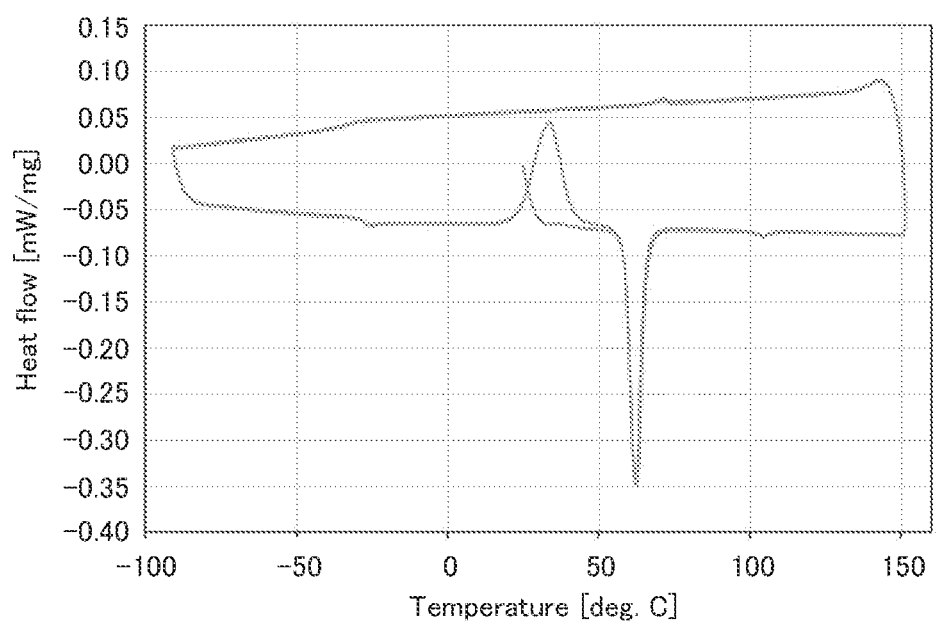
FIG. 4 is the result of a DSC measurement for the molten salt obtained in Example 1.
Figure 5:
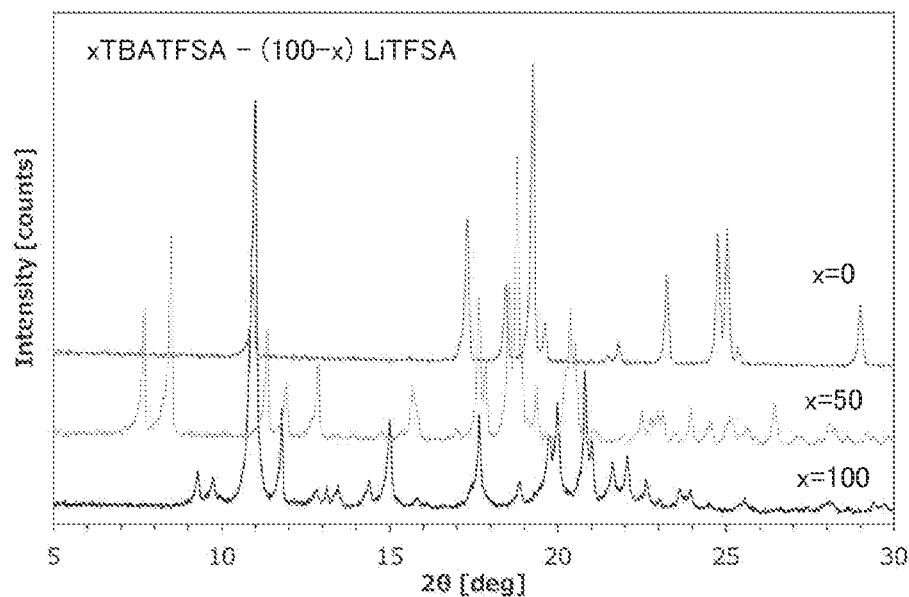
FIG. 5 is the result of an XRD measurement for the molten salt obtained in Example 1 and raw materials therefor.

As raw materials, tetrabutylammonium bis(trifluoromethanesulfonyl)amide (TBA-TFSA) and lithium bis(trifluoromethanesulfonyl)amide (Li-TFSA) were prepared. Next, TBA-TFSA and Li-TFSA were heated and mixed in the molar ratio of 1:1, and thereby a molten salt was obtained. To the obtained molten salt, a differential scanning calorimetry (DSC measurement) in the condition of 1° C./minute was conducted. The result is shown in FIG. 4. As shown in FIG. 4, the melting point of the obtained molten salt was 56° C., and it was in a solid state at a normal temperature (25° C.). Incidentally, the melting point of TBA-TFSA was 90° C. and the melting point of Li-TFSA was 235° C. Also, an X-ray diffraction (XRD) measurement at 25° C. was conducted to the obtained molten salt and each of the raw materials. The results are shown in FIG. 5. As shown in FIG. 5, it was confirmed that the obtained molten salt was a crystal material.

<Production of Anode Layer>

An anode active material (Si particle), the synthesized molten salt, and a dispersion medium (diisobutyl keton) were prepared as raw materials, and the mixture of these (solid content concentration: 75 weight %) was kneaded by a rotating and revolving mixer to obtain a granulated body. The conditions of the rotating and revolving mixer were 2000 rpm, intermittent operation, and total 1 hour. Next, to the obtained granulated body, a sulfide solid electrolyte ($Li_2S$—$P_2S_5$-based sulfide solid electrolyte), a conductive material (vapor grown carbon fiber), a binder (BR-based binder), and a dispersion medium (diisobutyl keton) were further added, and the obtained mixture was agitated using a thin-film spin system high-speed mixer (FILMIX) to produce an anode slurry. Here, the weight ratio of, the Si particle:the molten salt:the sulfide solid electrolyte:the conductive material:the binder, was 100:11.5:76:15:4. This anode slurry was pasted on an anode current collector (Ni foil) by a blade method, and dried on a hot plate at 100° C. for 30 minutes, and thereby an anode layer was obtained.

<Production of Solid Electrolyte Layer>

A solid electrolyte mixture including: a sulfide solid electrolyte ($Li_2S$—$P_2S_5$-based sulfide solid electrolyte), a binder (PVdF-based binder) and a dispersion medium (butyl butyrate) as raw materials, was agitated by an ultrasonic dispersion device to produce a solid electrolyte slurry. Here, the weight ratio of the sulfide solid electrolyte:the binder was 99.6:0.4. This solid electrolyte slurry was pasted on an Al foil by a blade method and dried on a hot plate at 100° C. for 30 minutes, and thereby a peelable solid electrolyte layer was obtained.

<Production of Cathode Layered Body>

The cathode layer and the peelable solid electrolyte layer were layered so that the mixture surface of the each was placed one upon another. The product was pressed in the conditions of pressing pressure of 50 kN/cm and temperature of 160° C. using a roll pressing machine, and then the Al foil of the solid electrolyte layer was peeled off and punched out into the size of 1 cm² to obtain a cathode layered body.

<Production of Anode Layered Body>

The anode layer and the peelable solid electrolyte layer were layered so that the mixture surface of the each was placed one upon another. The product was pressed in the conditions of pressing pressure of 50 kN/cm and temperature of 25° C. using a roll pressing machine, and then the Al foil of the solid electrolyte layer was peeled off and punched out into the size of 1.08 cm² to obtain an anode layered body. After that, the solid electrolyte layer of the anode layered body and the peelable solid electrolyte layer were layered so that the mixture surface of the each was placed one upon another. This layered body was temporary pressed with a plane uniaxial pressing machine in the conditions of the pressing pressure of 100 MPa and the temperature of 25° C. After that, the Al foil of the solid electrolyte layer was peeled off and punched out into the size of 1.08 cm² to obtain an additional anode layered body including a solid electrolyte layer.

<Production of Evaluation Battery>

The cathode layered body and the additional anode layered body including a solid electrolyte layer were layered so that the mixture surface of the each was placed one upon another. This layered body was pressed with a plane uniaxial pressing machine in the conditions of the pressing pressure of 200 MPa and the temperature of 120° C., to obtain a battery layered body. The obtained battery layered body was placed between two pieces of restraining plates, and these two pieces of restraining plates were fastened by a fastener in the restraining pressure of 10 MPa, and thereby an evaluation battery was produced.

Comparative Example 1

An evaluation battery was produced in the same manner as in Example 1 except that the anode layer was produced without producing the granulated body. In specific, an anode mixture including: an anode active material (Si particle), the synthesized molten salt, a sulfide solid electrolyte ($Li_2S$—$P_2S_5$-based sulfide solid electrolyte), a conductive material (vapor grown carbon fiber), a binder (BR-based binder), a dispersion medium (diisobutyl keton) as raw materials, was agitated by a thin-film spin system high-speed mixer (FILMIX) to produce an anode slurry. Here, the weight ratio of, the Si particle:the molten salt:the sulfide solid electrolyte:the conductive material:the binder, was 100:11.5:76:15:4. An evaluation battery was produced in the same manner as in Example 1 except that the obtained anode slurry was used.

Example 2

An evaluation battery was produced in the same manner as in Example 1 except that the restraining pressure to the battery layered body was changed to 5 MPa.

Comparative Example 2

An evaluation battery was produced in the same manner as in Comparative Example 1, except that the restraining pressure to the battery layered body was changed to 5 MPa.

[Evaluation]

Charge and discharge tests were conducted to the evaluation batteries obtained in Examples 1 to 2 and Comparative Examples 1 to 2. First, initial charge and discharge were conducted in the following conditions:

Constant-current (CC) charge at ½₀ C until 4.05 V, and then constant-voltage (CV) charge at 4.05 V until the termination current of ⅟₁₀₀ C; then, CC-discharge at ½₀ C until 2.5 V, and then CV-discharged at 2.5 V until the termination current of ⅟₁₀₀ C.

Next, for durability charge and discharge, charge and discharge were conducted in the following conditions:

Charge for durability: CC-charge at ⅓ C until 4.05 V; and
Discharge for durability: CC-discharge at ⅓ until 2.5 V.
Also, the charge and discharge for durability was conducted at 25° C. until the 105th cycle, and conducted at 60° C. from the 106th cycle.

In the stages of the 54th cycle, the 105th cycle, and the 156th cycle, instead of the charge and discharge for durability, charge and discharge for capacity confirmation were conducted in the following conditions:

Charge for capacity confirmation: CC-charge at ⅟₁₀ C until 4.05 V, and then CV-charge at 4.05 V until the termination current of ⅟₁₀₀ C; and
Discharge for capacity confirmation: CC-discharged at ⅟₁₀ C until 2.5 V, and then CV-discharged at 2.5 V until the termination current of ⅟₁₀₀ C.
Also, the charge and discharge for capacity confirmation were conducted at 25° C.

The initial discharge capacity was regarded as $C_1$, the discharge capacity of the 105th cycle was regarded as $C_2$, and the discharge capacity of the 156th cycle was regarded as $C_3$, and the capacity durability $C_2/C_1$, $C_3/C_1$) was obtained. The results are shown in Table 1. Also, the relations of the number of cycles and the capacity durability in Example 1 and Comparative Example 1 are shown in FIG. 6.

TABLE 1

|  | Example 1 | Comparative Example 1 | Example 2 | Comparative Example 2 |
|---|---|---|---|---|
| Capacity durability ($C_2/C_1$) | 87% | 84% | 72% | 70% |
| Capacity durability ($C_3/C_1$) | 78% | 74% | 54% | 51% |

Figure 6:
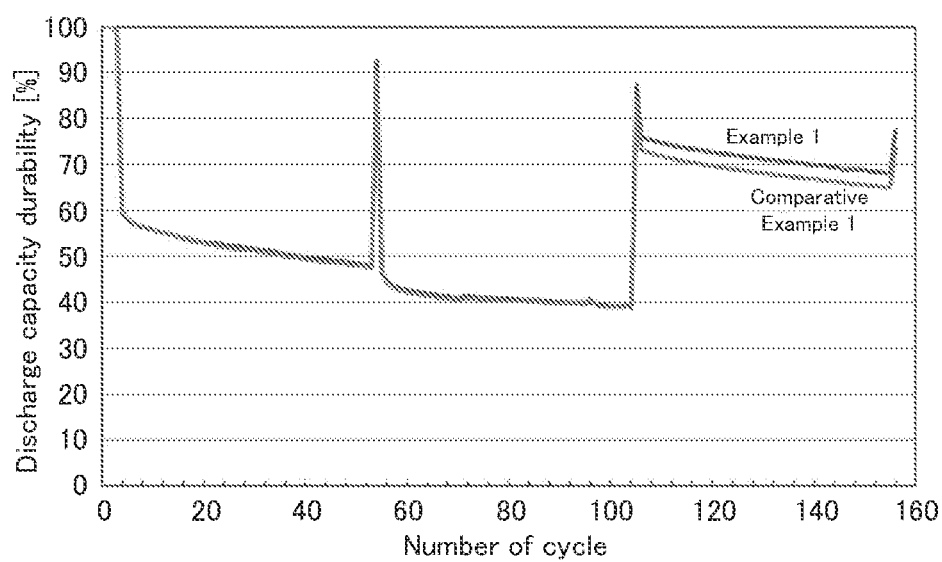
FIG. 6 is the result of a charge and discharge test for evaluation batteries produced in Example 1 and Comparative Example 1.

As shown in FIG. 6, the relations of the number of cycles and the capacity durability of Example 1 and Comparative Example 1 were similar, but both of $C_2/C_1$ and $C_3/C_1$ of Example 1 were larger than those of Comparative Example 1. It was presumed that there was a difference in the capacity durability since the granulated body of the Si particle and the molten salt was formed in Example 1, but such a granulated body was not formed in Comparative Example 1. In particular, when the temperature during discharge was changed from 25° C. to 60° C., the difference in the capacity durability became large. This was presumably because the molten salt in the liquid state filled in and repaired the crack in the anode layer generated due to the expansion and contraction of the Si particle. Also, the relation same as Example 1 and Comparative Example 1 was confirmed with respect to Example 2 and Comparative Example 2, in which the restraining pressure was changed to 5 MPa. In this manner, the molten salt capable of controlling its melting and solidifying by temperature was arranged near the Si-based active material which expanded and contracted upon charge and discharge, and a granulated body was formed of them, and thus thicker and longer Li ion conducting path was formed in the anode layer, and the all solid state battery with capacity durability was obtained.

REFERENCE SIGNS LIST 1 cathode layer
2 anode layer
3 solid electrolyte layer
4 cathode current collector
5 anode current collector
10 all solid state battery

What is claimed is:

1. An all solid state battery comprising a cathode layer, an anode layer, and a solid electrolyte layer arranged between the cathode layer and the anode layer, wherein:
the anode layer contains a granulated body including a Si-based active material and a molten salt, which is in a solid state at 25° C.; and
the molten salt contains lithium bis(trifluoromethanesulfonyl)amide (Li-TFSA) and tetrabutylammonium bis(trifluoromethanesulfonyl)amide (TBA-TFSA).

2. The all solid state battery according to claim 1, wherein a melting point of the molten salt is 30° C. or more and 120° C. or less.

3. The all solid state battery according to claim 1, wherein the molten salt includes an anion with a sulfonylamide structure.

4. The all solid state battery according to claim 1, wherein the anode layer contains a sulfide solid electrolyte.

5. The all solid state battery according to claim 1, wherein an average particle size $D_{50}$ of the Si-based active material is 2 μm or less.

6. The all solid state battery according to claim 1, wherein a molar ratio of the TBA-TFSA with respect to the Li-TFSA is 0.5 or more and 100 or less.

7. The all solid state battery according to claim 6, wherein the molar ratio of the TBA-TFSA with respect to the Li-TFSA is 1 or more and 50 or less.

8. A method for producing an all solid state battery including a cathode layer, an anode layer, and a solid electrolyte layer arranged between the cathode layer and the anode layer, the method comprising:
an anode layer forming step of forming the anode layer containing a granulated body including a Si-based active material and a molten salt, which is in a solid state at 25° C.,
wherein the molten salt contains lithium bis(trifluoromethanesulfonyl)amide (Li-TFSA) and tetrabutylammonium bis(trifluoromethanesulfonyl)amide (TBA-TFSA).

9. The method for producing the all solid state battery according to claim 8, wherein
the anode layer forming step includes:
a granulated body forming treatment of forming the granulated body by kneading the Si-based active material and the molten salt;
an anode mixture producing treatment of producing an anode mixture by agitating a mixture of the granulated body with at least one of a solid electrolyte and a conductive material; and
an anode layer forming treatment of forming the anode layer using the anode mixture.

10. A method for recovering an all solid state battery including a cathode layer, an anode layer, and a solid electrolyte layer arranged between the cathode layer and the anode layer, wherein:
the anode layer contains a granulated body including a Si-based active material and a molten salt, which is in a solid state at 25° C.;
the molten salt contains lithium bis(trifluoromethanesulfonyl)amide (Li-TFSA) and tetrabutylammonium bis(trifluoromethanesulfonyl)amide (TBA-TFSA); and
the method comprising a high temperature charge and discharge step of conducting charge and discharge at a temperature equal to or more than a melting point of the molten salt.

* * * * *